May 28, 1963 R. ALTSON 3,091,500
ANTIFRICTION BEARING
Filed Jan. 5, 1961
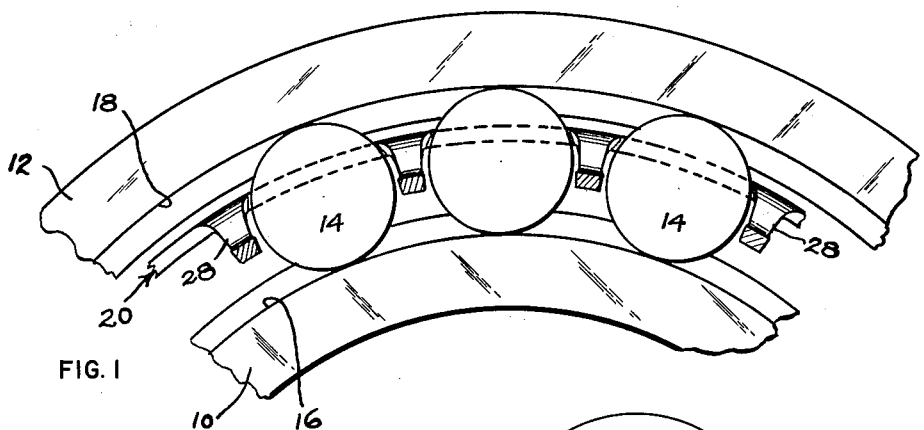
FIG. 1
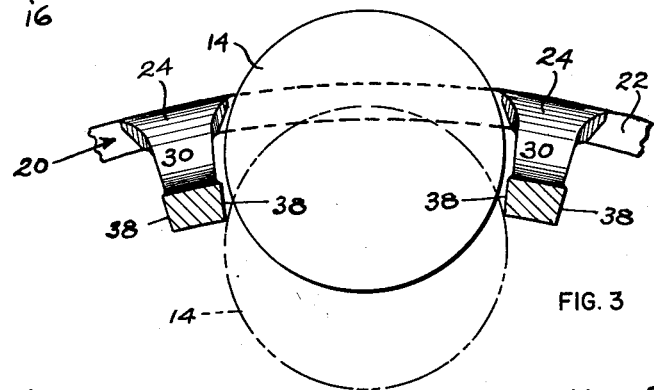
FIG. 3
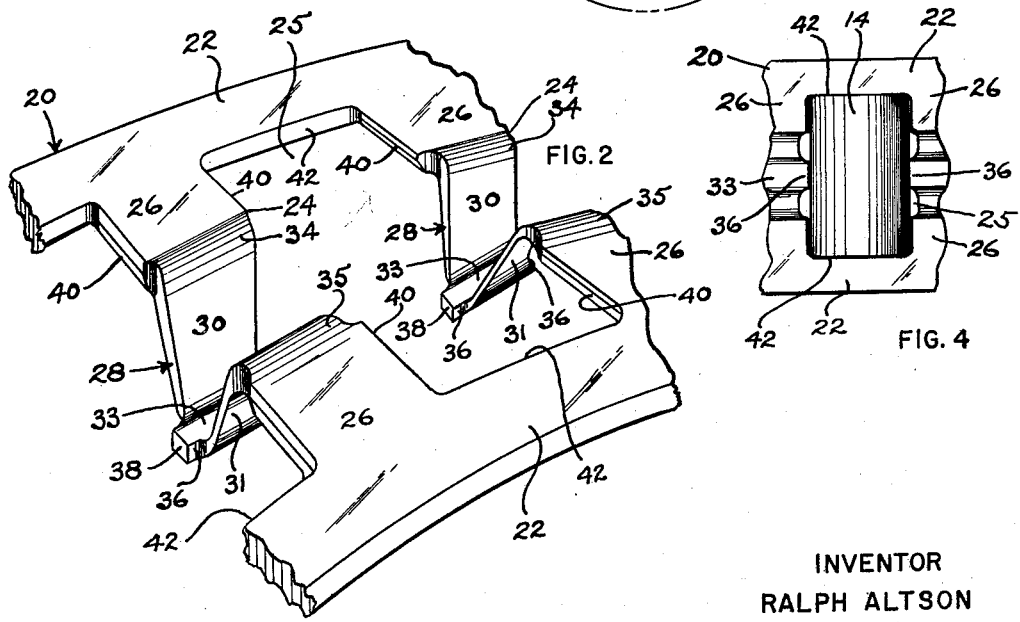
FIG. 2
FIG. 4
INVENTOR
RALPH ALTSON
By Edward H. Goodrich.
HIS ATTORNEY

United States Patent Office 3,091,500
Patented May 28, 1963

3,091,500
ANTIFRICTION BEARING
Ralph Altson, New York, N.Y., assignor to General Motors Corporation, Detroit, Mich., a corporation of Delaware
Filed Jan. 5, 1961, Ser. No. 80,868
4 Claims. (Cl. 308—217)

This invention relates to antifriction bearings and more particularly to an improved roller bearing cage for guiding the rolling elements in a bearing and for demountably holding the rolling elements in unit-handling relation with the cage.

Roller bearings as commonly employed for supporting radial loads, employ an inner race ring and an outer race ring which are relatively rotatable through an intervening series of circumferentially arranged rollers which engage circular raceways respectively formed in these race rings. One difficulty frequently encountered in such a bearing resides in the fact that these rollers often shift out of axially parallel relation with the axis of the bearing due to the uneven stress distributions throughout the lengths of these rollers. This uneven stress results from the fact that the stress concentration of a roller under load is weakest at the ends of the roller since the ends of the roller are not as well supported as the intermediate portions of the roller. Consequently, even though such rollers may be precisely ground to the required shape and size, this non-uniform distribution of stresses produces different deformations of the roller-engaged raceways at the ends of the rollers from that of the raceway deformations produced by intermediate portions of the rollers. Also, due to these non-uniform stress concentrations, the roller ends themselves deform differently from intermediate portions of the rollers when operating under load. Hence, these non-uniform stress concentrations frequently cause the ends of the rollers to rotate in raceway contact at a different rate from that of the central portions of the rollers, thereby causing an angular skewing of the rollers which results in a scuffing and sliding action of the rollers against the raceways with consequent rapid bearing wear and much shortened bearing life. This scuffing and skewing of the rollers is particularly troublesome in roller bearings that are operated at high rotational speeds under relatively light radial loads.

In an endeavor to overcome this objectionable feature which is common to many roller bearings, it has been the practice to provide a roller bearing wherein the rollers support the load only through a partial circumferential portion of the race rings and to let the rollers loosely locate between the opposing raceways when passing through the unloaded zone of the bearings. Additionally, certain cages have been provided for circumferentially spacing the rollers but in these cages it has been usual to loosely receive the rollers in circumferentially spaced pockets of the cage. With these prior constructions, the loose fit of the rollers within the unloaded zone of the bearing prevents the bearing from being a precision bearing wherein both race rings are maintained coaxial as is required in many of today's modern machines. Furthermore, with this loose fit of the rollers in the unloaded zone, the rollers tend to suddenly change their rate of circumferential movements as they enter and also as they leave the loaded zone of the bearing. This sudden change of acceleration of roller movement particularly in a high speed bearing, not only may cause skewing of the rollers but also adds to the damaging skidding feature of the rollers against the raceways. As a result, many roller bearings do not attain their intended life due to the rapid bearing wear resulting from this scuffing and skidding of the rollers against the raceways.

It is therefore an object of my invention to provide an improved cage for guiding the rolling elements in an antifriction bearing.

A further object of this invention is to provide an improved easily constructed roller bearing cage of simple light weight construction and which will maintain the rollers with their axes respectively located in planes each of which includes the axis of the roller bearing during operation of the bearing.

A further object of my invention is to provide an improved roller bearing cage which may be stamped out and bent to form from sheet material and which demountably receives rollers in unit-handling assembly therewith.

A still further object of my invention is to provide an improved and inexpensive cage for guiding the rollers in a roller bearing and which can be produced by simple forming and assembling operations and which receive rollers in demountable assembled relation therewith and maintains these rollers in axially parallel relation to each other.

To these ends and to improve generally upon devices of this character, this invention consists in the various matters hereinafter described and claimed. In its broader aspects, the invention is not necessarily limited to the specific arrangements selected for illustrative purposes in the accompanying drawings wherein FIGURE 1 is a fragmentary end view of a roller bearing embodying my improved cage construction;

FIGURE 2 is an enlarged fragmentary perspective view of the cage;

FIGURE 3 is a fragmentary section of the cage showing the demountable positioning of a roller therein; and FIGURE 4 is a fragmentary plan view showing the positioning of a roller in assembled relation with the cage.

In accordance with my invention, I have provided a precision antifriction roller bearing including an inner race ring 10 and an outer race ring 12 arranged for relative coaxial antifrictional rotation through a series of circumferentially spaced intervening rolling elements, as rollers 14, arranged for rolling engagement against circular raceways 16 and 18 formed in these inner and outer race rings. The rollers 14 are demountably secured in circumferentially spaced relation within an annular cage 20 located between the race rings 10 and 12 and preferably antifrictionally supported by these rollers in radially spaced relation to both race rings. This cage, which is light in weight but rugged in structure, may be stamped out and bent to form from suitable material, as sheet metal, and is herein illustrated as fabricated from a thin walled tube. However, if desired, the cage may be preformed from flat sheet material that is thereafter rolled up to the required diameter after which the ends are suitably secured together as by brazing or welding.

The cage 20 has a pair of similar coaxial circular end rings or flanges 22, herein shown cylindrical, between which extend circumferentially spaced cross bars 24 thus providing circumferentially spaced pockets 25 that respectively receive the rollers 14. Each cross bar has a pair of corresponding short aligned end portions 26 extending towards each other. The outer ends of the cross bars 26 are respectively integral with the end flanges 22 and these end portions form substantially lateral inward continuations of the flanges having the same radius as the flanges. The intermediate portion of each cross bar 24 has a corresponding U-shaped portion 28 which extends radially inwardly of the cage and is provided with a pair of divergent walls 30 and 31 interconnected at their inner ends by a curved portion 33. The walls 30 and 31 are preferably narrower in width than the end portions 26 in a direction circumferentially of the cage and the radially outer ends of the walls 30 and 31 are integrally connected to the inner ends of the end portions 26 through short bent portions 34 and 35.

The curved wall 33 at the juncture of the divergent walls 31 and 32, is provided with a pair of laterally projecting lugs 36 which project outwardly from each other circumferentially of the cage. Each of these lugs terminates in a flat end face 38. The end faces 38 in each pocket 25, which are in opposing relation, may be parallel to an intermediate radial plane of the cage and are spaced apart through a distance slightly less than that of the diameter of the roller 14 received therebetween. The edges of the end cross bar portions 26 are preferably bevelled at 40 for tangential light engagement with a roller to cooperatively position the roller in its cage pocket. These opposing roller guiding faces 40 in each pocket are spaced apart through a distance less than the diameter of the roller 14 received therebetween. As best shown in FIGURE 3, it will be noted that the diameter of my cage exceeds the diameter of the pitch circle of the roller axes when assembled in the cage. Also, the lugs 38 lie substantially radially inwardly of this pitch circle, and normally out of roller engagement.

It will be appreciated that with this cage construction each roller 14 projects radially inwardly from and radially outwardly beyond the cage thus cooperatively supporting the cage by the circumferentially spaced rollers. The corresponding and opposing edges of the arms 30, 31, in each cage pocket are spaced from each other through a distance circumferentially of the cage which exceeds the diameter of a roller so that the cage is normally supported through its light engagement of the parallel surfaces 40 on the cross arm portions 26 in light tangential engagement with the rollers. Additionally, each cage flange has a flat pocket end wall 42 adapted to engage the flat end of a roller 14. These roller guiding faces 40 and 42 antifrictionally contact the roller in the presence of lubricant within the bearing. This guiding engagement of the faces 40 against the rollers aided by the walls 42 against the ends of the rollers, assures that the rollers are all maintained with their axes in planes each of which includes the axis of bearing rotation. If the rollers are cylindrical, their axes will be maintained parallel to each other and to the axis of bearing rotation.

The radially inwardly projecting arms 30 and 31 of each U-shaped portion are slightly resilient thus permitting a roller 14 to be snapped past the opposing lugs 36 into a cage pocket 25 to facilitate the easy insertion and removal of a roller. With this arrangement, a full complement of rollers may be initially inserted within a cage and the unit-handling assembly of rollers and cage may thereafter be assembled with the race rings of a bearing. In some roller bearings wherein the rollers are located within a race ring having shoulders at the ends of one of the raceways, the cage may be located in position and the rollers may be radially snapped into their respective pockets after the cage has been positioned.

I claim:

1. In an antifriction bearing, a pair of relatively rotatable race rings engaged by a plurality of circumferentially arranged rolling elements therebetween, an annular cage between and radially spaced from both race rings, said cage having pockets receiving the rolling elements in circumferentially spaced relation, axially spaced cylindrical end rings on said cage, circumferentially spaced cross bars connected at their ends to said end rings, each cross bar being positioned between adjacent rolling elements, each of said cross bars having an end portion axially coextensive and conforming in curvature with one of the cylindrical end rings, walls on adjacent cross bars in guiding engagement with a rolling element therebetween, said walls having bearing surfaces parallel to the cage axis and tangentially engaging the rollers to support the cage in radially spaced relation to both race rings, the intermediate portion of each cross bar having a U-shaped portion extending from the cross bar generally radially of the cage, and a lug on each U-shaped portion laterally extending into closely spaced relation with the adjacent rolling element, said lugs and said walls on adjacent cross bars demountably securing the rolling elements in assembled relation with the cage.

2. In an antifriction bearing, a pair of relatively rotatable race rings engaged by a series of circumferentially disposed rollers therebetween, a roller guiding cage between and radially spaced from said rings and having axially spaced cylindrical end rings, circumferentially spaced cross bars extending between the end rings and forming therewith a series of circumferentially spaced pockets respectively receiving said rollers, the ends of said cross bars being transversely curved in conformity with and forming axially inward extensions of the peripheries of said cylindrical end rings, parallel end walls on said cross bars tangentially engaging the rollers radially outwardly of a pitch circle defined by the roller axes, said roller engagement with the end walls positioning the cage in spaced relation to both race rings, the intermediate portions of each cross bar having a yieldable U-shaped portion extending radially inwardly beyond the pitch circle of said roller axes, and each U-shaped portion having a pair of opposed lugs laterally extending into spaced relation with the roller in an adjacent pocket, and the spacing between lugs opposing each roller being slightly less than the roller diameter whereby the rollers may snap past said lugs and be demountably retained in said pockets.

3. In an antifriction bearing, a pair of relatively rotatable race rings engaged by a plurality of circumferentially arranged rollers therebetween, an annular cage between the race rings, said cage having pockets receiving the rollers in circumferentially spaced relation, axially spaced cylindrical end rings on said cage, circumferentially spaced cross bars connected at their outer ends to said end rings, each cross bar being positioned between a pair of adjacent rollers, each of said cross bars having an end portion axially coextensive with and transversely conforming in curvature with one of said cylindrical end rings, walls on adjacent cross bars in guiding engagement with the end portions of a pocketed roller therebetween, said walls having divergent bearing surfaces tangentially engaging a pocketed roller therebetween to support the cage in radially spaced relation to both of said race rings, the intermediate portion of each cross bar having a U-shaped portion extending from the cross bar generally radially inwardly of the cage, and a lug on each U-shaped portion laterally projecting therefrom towards a pocketed roller, each lug having a flat face tangentially engageable with the roller and substantially parallel to a radial plane of the cage passing through a pocketed roller, and said roller engageable surfaces in each pocket cooperatively and demountably securing the roller within its cage pocket.

4. In a cage for guiding the rollers between a pair of coaxial race rings in an antifriction bearing, a pair of axially spaced cylindrical end rings having cylindrical peripheries of the same diameter, circumferentially spaced cross bars extending between and respectively secured at their ends to the end rings, the ends of the cross bars being transversely curved in conforming relation to the end ring curvatures and forming inward axial extensions of said cylindrical peripheries, the cross bars and end rings forming circumferentially spaced pockets for respectively receiving said rollers, the intermediate portion of each cross bar having a radially inwardly disposed U-shaped portion provided with a pair of closely spaced divergent arms, each pair of said arms being interconnected at their inner ends, the arms being in spaced relation to the rollers in adjacent pockets, parallel end walls on each cross bar tangentially engaging the pocketed rollers and supporting the cage on said rollers in radially spaced relation to both race rings, the opposing end walls in each pocket being spaced apart circumferentially of the cage through a distance less than the diameter of a roller, flat parallel end walls on the end rings in said pockets and engageable with the ends of said rollers, lugs laterally projecting from the interconnected ends of each pair of arms into spaced relation with a pocketed roller, the opposing lugs in each pocket being spaced apart through a distance less than that of a roller diameter, and said cross bars being cooperatively resilient whereby all of the rollers may be snapped past the lugs for demountable positioning within said pockets.

References Cited in the file of this patent

UNITED STATES PATENTS

| | | |
|---|---|---|
| 1,395,244 | Andre | Nov. 1, 1921 |
| 2,202,792 | Gothberg | May 28, 1940 |
| 2,848,791 | Neese | Aug. 26, 1958 |

FOREIGN PATENTS

| | | |
|---|---|---|
| 404,274 | Italy | June 5, 1943 |
| 1,001,550 | Germany | Jan. 24, 1957 |